United States Patent
Jin

(10) Patent No.: US 9,819,599 B2
(45) Date of Patent: Nov. 14, 2017

(54) METHOD AND SYSTEM FOR IMPROVING BANDWIDTH ALLOCATION EFFICIENCY

(71) Applicant: ZTE Corporation, Shenzhen (CN)

(72) Inventor: Jun Jin, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 14/774,932

(22) PCT Filed: Aug. 19, 2013

(86) PCT No.: PCT/CN2013/081776
§ 371 (c)(1),
(2) Date: Sep. 11, 2015

(87) PCT Pub. No.: WO2014/139267
PCT Pub. Date: Sep. 18, 2014

(65) Prior Publication Data
US 2016/0028638 A1    Jan. 28, 2016

(30) Foreign Application Priority Data
Mar. 11, 2013    (CN) .......................... 2013 1 0076779

(51) Int. Cl.
*H04J 14/00*    (2006.01)
*H04B 10/20*    (2006.01)
(Continued)

(52) U.S. Cl.
CPC .......... *H04L 47/30* (2013.01); *H04L 12/6418* (2013.01); *H04L 41/0896* (2013.01);
(Continued)

(58) Field of Classification Search
USPC ........................................ 398/58, 66, 98, 45
See application file for complete search history.

(56) References Cited

U.S. PATENT DOCUMENTS

| 7,385,995 B2 * | 6/2008 | Stiscia | H04J 3/1682 370/412 |
| 7,602,800 B2 * | 10/2009 | Endo | H04L 47/115 370/395.41 |

(Continued)

FOREIGN PATENT DOCUMENTS

| CN | 1588950 A | 3/2005 |
| CN | 101056146 A | 10/2007 |

(Continued)

OTHER PUBLICATIONS

European Search Report for corresponding application EP13878104; report dated Feb. 17, 2016.
(Continued)

*Primary Examiner* — David Payne
*Assistant Examiner* — Pranesh Barua
(74) *Attorney, Agent, or Firm* — Cantor Colburn LLP

(57) ABSTRACT

Provided are a method and system for improving bandwidth allocation efficiency, relating to optical communication field. In a PON system, an ONU detects each TCONT of the ONU in real time, and sends to an OLT a private message used for reporting buffer overflow when detecting that buffer overflow occurs on a TCONT; the OLT sends, according to the received private message used for reporting the buffer overflow, to the ONU a private message used for instructing the ONU to activate an overflow allocation mechanism; after receiving the private message used for instructing the ONU to activate the overflow allocation mechanism, the ONU activates the overflow allocation mechanism, calculates an actual traffic of a buffer of the TCONT, and sends the actual traffic of the buffer of the TCONT to the OLT; and the OLT dynamically allocates bandwidth to the TCONT according to the actual traffic of the buffer of the TCONT.

12 Claims, 3 Drawing Sheets

(51) Int. Cl.
*H04J 14/08* (2006.01)
*H04L 12/835* (2013.01)
*H04L 12/64* (2006.01)
*H04L 12/24* (2006.01)
*H04L 12/911* (2013.01)
*H04Q 11/00* (2006.01)

(52) U.S. Cl.
CPC ....... *H04L 47/745* (2013.01); *H04Q 11/0067* (2013.01); *H04Q 2011/0086* (2013.01)

(56) References Cited

U.S. PATENT DOCUMENTS

| | | | | |
|---|---|---|---|---|
| 7,818,389 | B1* | 10/2010 | Chiang | H01M 4/92 709/212 |
| 7,885,186 | B2* | 2/2011 | MacLean | H04J 3/1617 370/230.1 |
| 8,437,355 | B1* | 5/2013 | Goodson | H04Q 11/0067 370/395.4 |
| 2004/0109688 | A1* | 6/2004 | Kim | H04Q 11/0067 398/68 |
| 2004/0141759 | A1* | 7/2004 | Stiscia | H04J 3/1682 398/168 |
| 2004/0196869 | A1* | 10/2004 | Tsuchida | H04L 12/44 370/468 |
| 2007/0133988 | A1* | 6/2007 | Kim | H04J 3/1694 398/69 |
| 2007/0237177 | A1* | 10/2007 | Endo | H04L 47/115 370/468 |
| 2008/0089686 | A1* | 4/2008 | Kazawa | H04J 3/1694 398/71 |
| 2008/0273878 | A1* | 11/2008 | Wu | H04J 3/1694 398/67 |
| 2008/0279554 | A1* | 11/2008 | Kazawa | H04J 3/1694 398/69 |
| 2009/0022494 | A1* | 1/2009 | Yang | H04J 3/1694 398/63 |
| 2009/0103545 | A1* | 4/2009 | Anschutz | H04L 12/2885 370/395.4 |
| 2009/0245784 | A1* | 10/2009 | Wang | H04Q 11/0067 398/25 |
| 2010/0021161 | A1* | 1/2010 | Endo | H04L 47/115 398/45 |
| 2010/0098414 | A1* | 4/2010 | Kramer | H04L 47/10 398/45 |
| 2010/0208747 | A1* | 8/2010 | Gordon | H04J 3/1694 370/468 |
| 2010/0254707 | A1* | 10/2010 | Peng | H04L 47/10 398/58 |
| 2010/0316376 | A1* | 12/2010 | Qiu | H04Q 11/0062 398/25 |
| 2011/0221593 | A1* | 9/2011 | Han | H04L 41/0896 340/540 |
| 2011/0305451 | A1* | 12/2011 | Nishitani | H04L 12/5695 398/25 |
| 2011/0305455 | A1* | 12/2011 | Helleberg Andersen | H04J 14/00 398/41 |
| 2011/0311221 | A1* | 12/2011 | Mukai | H04J 3/1694 398/25 |
| 2011/0318008 | A1* | 12/2011 | Kubo | H04L 12/12 398/66 |
| 2012/0093500 | A1* | 4/2012 | Shiba | H04J 14/0246 398/25 |
| 2012/0106958 | A1* | 5/2012 | Sakamoto | H04J 14/0282 398/58 |
| 2012/0188874 | A1* | 7/2012 | Kumagai | H04L 47/2441 370/235 |
| 2012/0224858 | A1* | 9/2012 | Chen | H04J 3/1617 398/98 |
| 2012/0294611 | A1* | 11/2012 | Adler | H04Q 11/0067 398/45 |
| 2012/0321315 | A1* | 12/2012 | Timm | H04Q 11/0067 398/67 |
| 2013/0094860 | A1* | 4/2013 | Wu | H04B 10/27 398/66 |
| 2013/0170375 | A1* | 7/2013 | Kim | H04W 88/06 370/252 |
| 2013/0170826 | A1* | 7/2013 | Cvijetic | H04Q 11/0067 398/9 |
| 2013/0209103 | A1* | 8/2013 | Melts | H04B 10/27 398/58 |
| 2013/0230326 | A1* | 9/2013 | Hu | H04Q 11/0067 398/67 |

FOREIGN PATENT DOCUMENTS

| | | |
|---|---|---|
| CN | 101583056 A | 11/2009 |
| EP | 2012463 A1 | 1/2009 |
| WO | 2004064263 A2 | 7/2004 |

OTHER PUBLICATIONS

International Search Report for corresponding application PCT/CN2013/081776 filed Aug. 19, 2013; dated Dec. 19, 2013.

* cited by examiner

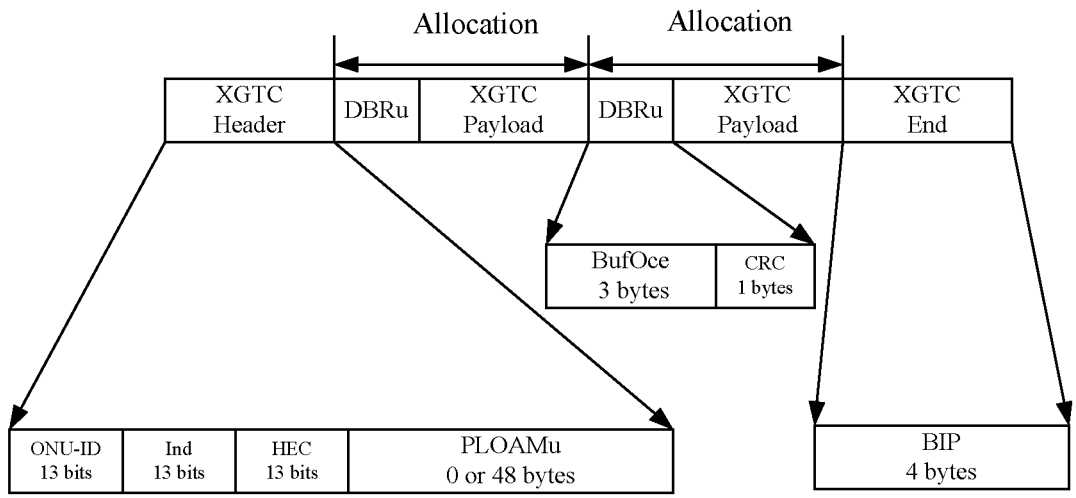

Fig. 1

201: In a PON system, an ONU detects each TCONT of the ONU in real time, and sends to an OLT a private message used for reporting buffer overflow when detecting that buffer overflow occurs on a TCONT 202: The OLT sends, according to the received private message used for reporting the buffer overflow, to the ONU a private message used for instructing the ONU to activate an overflow allocation mechanism 203: After receiving the private message used for instructing the ONU to activate the overflow allocation mechanism, the ONU activates the overflow allocation mechanism, calculates an actual traffic of a buffer of the TCONT, and sends the actual traffic of the buffer of the TCONT to the OLT 204: The OLT dynamically allocates a bandwidth to the TCONT according to the actual traffic of the buffer of the TCONT

Fig. 2

METHOD AND SYSTEM FOR IMPROVING BANDWIDTH ALLOCATION EFFICIENCY

TECHNICAL FIELD

The present disclosure relates to the field of optical communications, and in particular to a method and a system for improving bandwidth allocation efficiency in a Passive Optical Network (PON) system.

BACKGROUND

In a 10-Gigabit Passive Optical Network (XGPON) protocol, each Optical Network Unit (ONU) might have multiple Transmission Containers (TCONTs), wherein each TCONT is identified by an allocation identifier Alloc_ID, and a corresponding uplink data stream is defined as one data Allocation. In the frame structure of an uplink frame, as shown in FIG. 1, each Allocation has one Dynamic Bandwidth Report upstream (DBRu) area, wherein the DBRu area contains a 3-byte BufOcc field and a 1-byte CRC. The BufOcc represents all Service Data Unit (SDU) traffic (flow) values passing through the buffer correlated to the Alloc_ID of the allocated bandwidth, wherein the expression value of the traffic takes 4-byte as a unit. According to the Dynamic Bandwidth Allocation (DBA) protocol requirement in the XGPON protocol, the DBA calculation based on a State Report (SR) mode is to allocate bandwidth based on the data content of BufOcc.

In an XGPON Optical Line Terminal (OLT) system of the related art, the formula of bandwidth allocation based on the SR mode is as follows: grant(i)=alpha*dbru(i), where i represents an identifier of a TCONT and alpha represents a smooth coefficient.

In an XGPON Optical network Unit (ONU) system of the related art, the buffer of an ONU is realized through Double Data Rate (DDR) Synchronous Dynamic Random Access Memory (SDRAM). According to the inherent row-column relationship of the DDR, each row is defined as one buffer space, which corresponds to one buffer identifier buf id. Each Alloc_ID of the ONU is fixedly allocated with multiple buf ids, in this way, the number of buf ids determines the buffer capacity of one Alloc_ID. The ONU also refers to the number of the buffer areas corresponding to Alloc_ID while reporting the DBRu value (which refers to the BufOcc value in the DBRu field). However, different types of ONUs have different buffer management mechanisms, and the utilization efficiency of buffer and the size of buffer are different too; considering this factor, when an OLT PON interfaces is coupled with ONUs of different models in an XGPON system, for the Alloc_ID of the same configuration and traffic model, the OLT may also allocate different bandwidths, which affects fairness and allocation efficiency of the XGPON network.

The main reason lies in that: since the buffer space is limited and buffer overflow occurs when a TCONT receives a large traffic, in such a condition, the reported DBRu keeps in a constant value, which is theoretically the maximum value of the Alloc_ID buffer. At this time, the OLT does not know the actual condition of the TCONT, and thus the OLT still allocates bandwidth according to the original DBRu value. This is a very common condition in actual applications where different ONUs behave differently, e.g., the ONUs with relatively larger buffer work normally while the ONUs with relatively smaller buffer may have continuous packet loss.

SUMMARY

The embodiments of the present disclosure provide a method and a system for improving bandwidth allocation efficiency, which can better resolve the problem of data packet loss at the ONU because an OLT still allocates bandwidth according to a constant value of DBRu when buffer overflow occurs on a TCONT, so that a DBA can still allocate bandwidth correctly when buffer overflow occurs on the Alloc_ID of the ONU (that is, when buffer overflows occurs on the TCONT), thereby supporting the transmission of a large traffic on the ONU.

According to one aspect of the embodiments of the present disclosure, a method for improving bandwidth allocation efficiency is provided, including: in a PON system, an ONU detects each TCONT of the ONU in real time, and sends to an OLT a private message used for reporting buffer overflow when detecting that buffer overflow occurs on a TCONT; the OLT sends, according to the received private message used for reporting the buffer overflow, to the ONU a private message used for instructing the ONU to activate an overflow allocation mechanism; after receiving the private message used for instructing the ONU to activate the overflow allocation mechanism, the ONU activates the overflow allocation mechanism, calculates an actual traffic of a buffer of the TCONT, and sends the actual traffic of the buffer of the TCONT to the OLT; and the OLT dynamically allocates a bandwidth to the TCONT according to the actual traffic of the buffer of the TCONT.

In an example embodiment, the private message used for reporting the buffer overflow includes TCONT buffer overflow indication information, an allocation identifier for identifying the TCONT, and buffer parameter information.

In an example embodiment, the OLT receives the private message used for reporting the buffer overflow, calculates a theoretical maximum bandwidth supported by the TCONT corresponding to the allocation identifier according to the buffer parameter information contained in the private message used for reporting the buffer overflow, and generates, according to the theoretical maximum bandwidth, a remaining bandwidth of a PON interface of the OLT and a priority of the TCONT, the private message used for instructing the ONU to activate the overflow allocation mechanism, wherein the generated private message used for instructing the ONU to activate the overflow allocation mechanism includes an overflow mode admission control identifier and an allocation identifier used for identifying the TCONT.

In an example embodiment, after the ONU receives the private message used for instructing the ONU to activate the overflow allocation mechanism, the ONU activates the overflow allocation mechanism according to the overflow mode admission control identifier contained in the private message used for instructing the ONU to activate the overflow allocation mechanism, and calculates, according to the allocation identifier, a sum of the amount of data entering the buffer of the TCONT and the amount of data not entering the buffer of the TCONT due to buffer overflow to obtain the actual traffic of the buffer of the TCONT, and sends the actual traffic of the buffer of the TCONT to the OLT.

In an example embodiment, the method further includes: when detecting that the buffer of the TCONT is not overflowed any more, the ONU generates a private message used for reporting no buffer overflow, and sends the generated private message used for reporting no buffer overflow to the OLT, wherein the private message used for reporting no buffer overflow includes TCONT buffer overflow exit indication information and an allocation identifier used for identifying the TCONT.

In an example embodiment, the method further includes: the OLT receives the private message used for reporting no buffer overflow, generates, according to the TCONT buffer overflow exit indication information contained in the private message used for reporting no buffer overflow, a private message used for instructing the ONU to stop the overflow allocation mechanism, sends the generated private message used for instructing the ONU to stop the overflow allocation mechanism to the ONU, wherein the private message used for instructing the ONU to stop the overflow allocation mechanism includes an overflow mode stop control identifier and the allocation identifier used for identifying the TCONT.

In an example embodiment, the method further includes: when the OLT detects that a remaining bandwidth of a PON interface is reduced, the OLT sends a private message used for instructing the ONU to stop the overflow allocation mechanism to the ONU, wherein the private message used for instructing the ONU to stop the overflow allocation mechanism includes an overflow mode stop control identifier and an allocation identifier used for identifying the TCONT.

In an example embodiment, the method further includes: after the ONU receives the private message used for instructing the ONU to stop the overflow allocation mechanism, the ONU stops the overflow allocation mechanism of the TCONT corresponding to the allocation identifier according to the overflow mode stop control identifier.

In an example embodiment, the PON system is a 10-GPON (XGPON) system; the private messages used for reporting the buffer overflow or no buffer overflow is a Dynamic Bandwidth Report upstream Physical Layer Operation Administration and Maintenance (Dbru_Report PLOAM) message; and the private message used for instructing to activate or stop the overflow allocation mechanism is a Dynamic Bandwidth Report upstream Control Physical Layer Operation Administration and Maintenance (Dbru_Control PLOAM) message.

According to another aspect of the embodiments of the present disclosure, a system for improving bandwidth allocation efficiency is provided, including: an ONU, which is set in a PON system and is configured to: detect each TCONT of the ONU in real time, send a private message used for reporting buffer overflow to an OLT when detecting that buffer overflow occurs on a TCONT, activate an overflow allocation mechanism after receiving a private message used for instructing the ONU to activate an overflow allocation mechanism, calculate an actual traffic of a buffer of the TCONT and send the actual traffic of the buffer of the TCONT to the OLT; an OLT, which is configured to send, according to the received private message used for reporting the buffer overflow, to the ONU the private message used for instructing the ONU to activate the overflow allocation mechanism, and dynamically allocate a bandwidth to the TCONT according to the actual traffic of the buffer of the TCONT from the ONU.

Compared with the related art, the embodiments of the present disclosure achieve effects as follows: an ONU reports the buffer overflow of a TCONT to an OLT, so that the OLT can adjust the bandwidth allocation mode in time; thus, the efficiency of bandwidth allocation is improved, a single ONU can support services of larger traffic, meanwhile performance difference caused by different ONU buffers is effective reduced.

BRIEF DESCRIPTION OF THE DRAWINGS

FIG. 1 shows a frame structure of an uplink frame in XGPON according to the related art;

FIG. 2 shows a flowchart of a method for improving bandwidth allocation efficiency according to an embodiment of the present disclosure;

DETAILED DESCRIPTION OF THE EMBODIMENTS

The example embodiments of the present disclosure are described below in conjunction with accompanying drawings. It should be understood that the example embodiments described below are only to describe and illustrate but to limit this present disclosure.

Since XGPON is a time division system at uplink, each Alloc_ID can transmit data in an uplink timeslot only; therefore, data packets should be stored and then forwarded after entering an ONU. If the buffer is already full before the transmission timeslot corresponding to the Alloc_ID arrives, data packets will be discarded. However, it is found from actual applications that many data packets can be read and transmitted immediately after these data packets enter the buffer if the bandwidth is large enough, namely, this part of data almost does not need to be put into the buffer. According to theoretical analysis, if an OLT is able to learn the actual traffic condition of an Alloc_ID, the Alloc_ID absolutely can support a data traffic exceeding the maximum buffer value.

Figure 4:
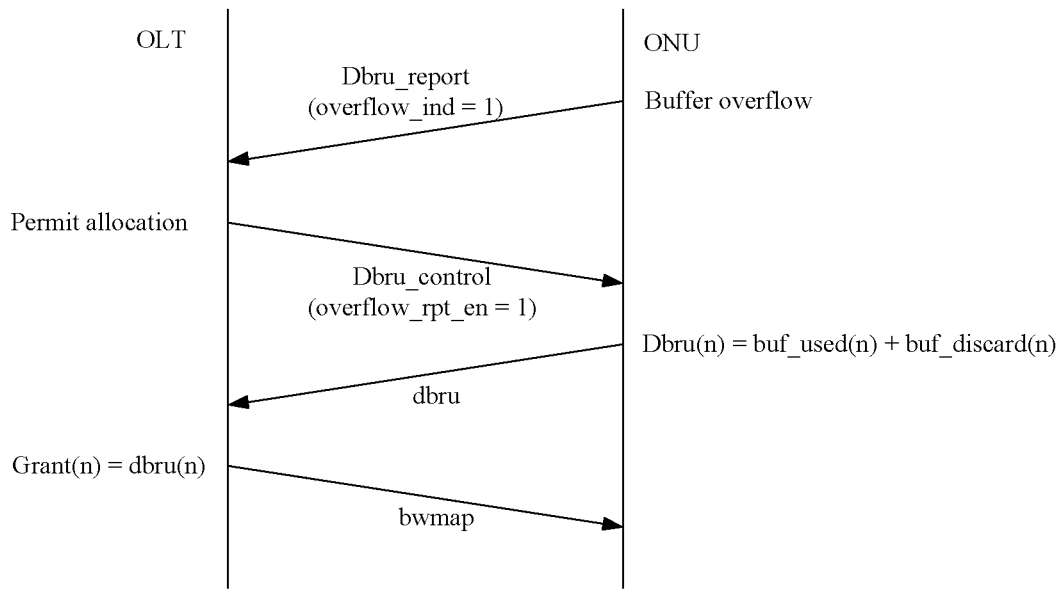
FIG. 4 shows a handshake flowchart of a DBA overflow allocation mechanism according to an embodiment of the present disclosure.

A further description is provided to the embodiments of the present disclosure in conjunction with FIG. 2 and FIG. 4.

FIG. 2 shows a flowchart of a method for improving bandwidth allocation efficiency according to an embodiment of the present disclosure. As shown in FIG. 2, the method includes following steps 201 to 204.

Step 201: in a PON system, an ONU detects each TCONT of the ONU in real time, and sends to an OLT a private message used for reporting buffer overflow when detecting that buffer overflow occurs on a certain TCONT.

In Step 201, the private message used for reporting the buffer overflow includes TCONT buffer overflow indication information, an allocation identifier for identifying the TCONT, and buffer parameter information.

Step 202: the OLT sends, according to the received private message used for reporting the buffer overflow, to the ONU a private message used for instructing the ONU to activate an overflow allocation mechanism.

In Step 202, the OLT receives the private message used for reporting the buffer overflow, calculates a theoretical maximum bandwidth supported by the TCONT corresponding to the allocation identifier according to the buffer parameter information contained in the private message used for reporting the buffer overflow, and generates, according to the theoretical maximum bandwidth, a remaining bandwidth of a PON interface of the OLT and a priority of the TCONT, the private message used for instructing the ONU to activate the overflow allocation mechanism, wherein the generated private message used for instructing the ONU to activate the overflow allocation mechanism includes an overflow mode admission control identifier and an allocation identifier used for identifying the TCONT.

Step 203: after receiving the private message used for instructing the ONU to activate the overflow allocation mechanism, the ONU activates the overflow allocation mechanism, calculates an actual traffic of a buffer of the TCONT, and sends the actual traffic of the buffer of the TCONT to the OLT.

In Step 203, after the ONU receives the private message used for instructing the ONU to activate the overflow allocation mechanism, the ONU activates the overflow allocation mechanism according to the overflow mode admission control identifier contained in the private message used for instructing the ONU to activate the overflow allocation mechanism, and calculates, according to the allocation identifier, a sum of the amount of data entering the buffer of the TCONT and the amount of data not entering the buffer of the TCONT due to buffer overflow to obtain the actual traffic of the buffer of the TCONT, and sends the actual traffic of the buffer of the TCONT to the OLT.

Step 204: the OLT dynamically allocates a bandwidth to the TCONT according to the actual traffic of the buffer of the TCONT.

In an example embodiment, when detecting that the buffer of the TCONT is not overflowed any more, the ONU generates a private message used for reporting no buffer overflow, and sends the generated private message used for reporting no buffer overflow to the OLT, wherein the private message used for reporting no buffer overflow includes TCONT buffer overflow exit indication information and an allocation identifier used for identifying the TCONT. The OLT receives the private message used for reporting no buffer overflow, generates, according to the TCONT buffer overflow exit indication information contained in the private message used for reporting no buffer overflow, a private message used for instructing the ONU to stop the overflow allocation mechanism, and sends the generated private message used for instructing the ONU to stop the overflow allocation mechanism to the ONU, so that the ONU stops the overflow allocation mechanism of the TCONT corresponding to the allocation identifier according to the overflow mode stop control identifier after receiving the private message used for instructing the ONU to stop the overflow allocation mechanism, wherein the private message used for instructing the ONU to stop the overflow allocation mechanism includes an overflow mode stop control identifier and an allocation identifier used for identifying the TCONT.

In an example embodiment, when the OLT detects that a remaining bandwidth of a PON interface is reduced, the OLT sends a private message used for instructing the ONU to stop the overflow allocation mechanism to the ONU, wherein the private message used for instructing the ONU to stop the overflow allocation mechanism includes an overflow mode stop control identifier and an allocation identifier used for identifying the TCONT.

In an example embodiment, the PON system is a 10-GPON (XGPON) system; the private message used for reporting buffer overflow or no buffer overflow is a Dbru_Report PLOAM message; and the private message used for instructing activate or stop the overflow allocation mechanism is Dbru_Control PLOAM message.

Figure 3:
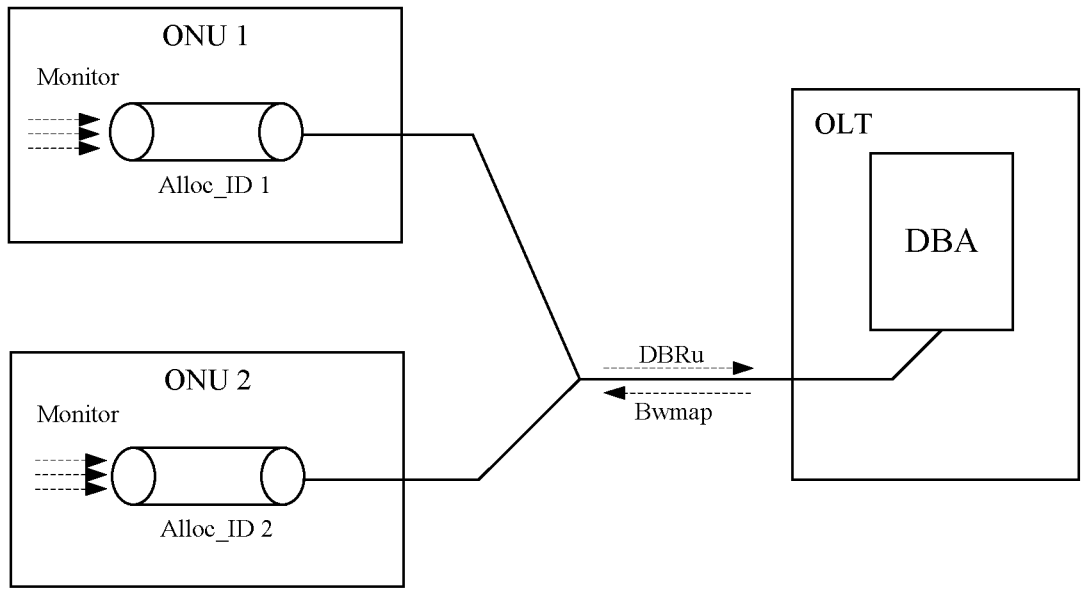
FIG. 3 shows a DBA overflow allocation mechanism model according to an embodiment of the present disclosure.

FIG. 3 shows a DBA overflow allocation mechanism model according to an embodiment of the present disclosure. As shown in FIG. 3, the system includes:

an ONU, which is set in a PON system and is configured to: detect each TCONT of the ONU in real time, send a private message used for reporting buffer overflow to an OLT when detecting that buffer overflow occurs on a TCONT, activate an overflow allocation mechanism after receiving from the OLT a private message used for instructing the ONU to activate the overflow allocation mechanism, calculate an actual traffic of a buffer of the TCONT and send the actual traffic of the buffer of the TCONT to the OLT;

an OLT, which is configured to send, according to the received private message used for reporting the buffer overflow, to the ONU the private message used for instructing the ONU to activate the overflow allocation mechanism, and dynamically allocate a bandwidth to the TCONT according to the actual traffic of the buffer of the TCONT from the ONU.

The PON system is a 10-GPON (XGPON) system; the private message used for reporting buffer overflow or no buffer overflow is a Dbru_Report PLOAM message; and the private message used for instructing to activate the overflow allocation mechanism is a Dbru_Control PLOAM message.

Based on the existing XGPON protocol, one private PLOAM message is added in uplink and downlink respectively to interact all state and configuration information between the OLT and the ONU in the condition of buffer overflow of a certain Alloc_ID. In addition, in conjunction with the interaction information, the method of the ONU reporting DBRu and the method of the OLT allocating bandwidth are improved.

The main working flow of the above system mainly includes following steps A to D.

Step A: the ONU reports a buffer overflow condition.

The ONU detects the buffer occupation of each TCONT in real time, if it is found that the traffic is too large which results in buffer overflow on a TCONT, the ONU reports the buffer size of the TCONT and the buffer overflow condition through an uplink private Dbru_Report PLOAM message (as shown in Table 1).

Step B: the OLT determines whether to activate an overflow allocation mechanism.

The OLT determines whether to activate a DBRu overflow report mode according to the reported state, and notifies the ONU whether to activate an overflow allocation mechanism for the TCONT through a downlink private Dbru_control PLOAM message (as shown in Table 2), that is, notifies the ONU whether to activate the overflow allocation mechanism for the TCONT, i.e., notifies the ONU whether to enable the TCONT to enter an overflow report mode.

Step C: the ONU enters the overflow report mode.

After receiving from the OLT the Dbru_control PLOAM message of notifying the admission of overflow reporting, the ONU activates an overflow allocation mechanism for the TCONT, changes the DBRU report mode, calculates the actual traffic entering the buffer of the current Alloc_ID (including the traffic discarded due to full buffer), and reports the actual traffic value to the OLT through BufOcc.

Step D: the OLT enters an overflow based bandwidth allocation mode.

The OLT adjusts the bandwidth allocation mode according to the overflow mode DBRU value reported by the ONU, so as to improve the bandwidth utilization efficiency.

TABLE 1

| Byte | Content | Description |
| --- | --- | --- |
| 1-2 | ONU-ID | ONU_ID corresponding to the TCONT |
| 3 | 0x20 | Message type of "Dbru_report" |
| 4 | SeqNo | Sequence number |
| 5-20 | Alloc_ID | TCONT ID of Sender |
| 21-28 | Buf_num | Value indicative of the number of buffer identifiers occupied by the TCONT, indicating that there are 2 to the power of buf_num buf_ids. |
| 29-36 | Buf_len | Value indicative of the data amount that can be stored in the buffer corresponding to the buffer identifier, indicating that there are 2 to the power of buf_len bytes. |
| 37 | Overflow_Ind | TCONT buffer overflow indication:<br>1: overflow<br>2: overflow exit |
| 38-40 | Padding | Set as 0x00 by the sender, and the receiver processes it as "don't care" |
| 41-48 | MIC | Message integrity check |

TABLE 2

| Byte | Content | Description |
| --- | --- | --- |
| 1-2 | ONU-ID | ONU_ID corresponding to the TCONT |
| 3 | 0x15 | Message type of "Dbru_control" |
| 4 | SeqNo | Sequence number |
| 5-20 | Alloc_ID | Tcont id of Sender |
| 21 | Overflow_Rpt_En | DBRu overflow mode admission control:<br>1: allowed<br>2: not allowed |
| 22-40 | Padding | Set as 0x00 by the sender, and the receiver processes it as "don't care" |
| 41-48 | MIC | Message integrity check |

Oppositely, when the traffic of the ONU changes and the buffer of the TCONT is not overflowed any more, the OLT and the ONU system can repeat the above steps and exit the DBRu overflow allocation mechanism to return to the normal bandwidth allocation.

FIG. 4 shows a handshake flowchart of a DBA overflow allocation mechanism according to an embodiment of the present disclosure. In the existing XGPON DBA protocol, there is a traffic method (TM) based DBA allocation method. Although this method can avoid the problem caused by DBRu overflow, this method excessively relies on the statistic values of uplink payload pm and uplink idle frame; in order to enable the bandwidth prediction to follow the actual traffic amount of the ONU in real time and to solve some errors in projections, generally the allocated bandwidth is relatively large and thus causes unnecessary bandwidth waste. The method in the embodiments of the present disclosure improves the DBA system based on the SR manner, enables both OLT and ONU to enter the DBRu overflow working mode by adding a private PLOAM message, thereby effectively solving the above problem. The specific implementation is as shown in FIG. 4, including Steps 1 to 4 described as follows.

Step 1: the ONU reports a buffer overflow condition.

One ONU can support multiple TCONTs at the same time. Each TCONT is expressed by an Alloc_ID. The ONU allocates a certain independent buffer space to each Alloc_ID. There might be some ONU that has an extra buffer space for multiple Alloc_ID to share, however, generally, there is a maximum buffer limit. The buffer occupation for each Alloc_ID is detected in real time (as shown in FIG. 3). When multiple streams of traffic corresponding to an Alloc_ID enter a buffer, if buffer overflow is detected, the ONU calculates the data amount discarded due to buffer overflow, and meanwhile reports to the OLT the buffer size of the TCONT and the buffer overflow condition through an uplink private Dbru_Report PLOAM message (as shown in Table 1).

The message type message_id of the Dbru_Report PLOAM message is fixed as 0x20. The Dbru_Report PLOAM message is sent when overflow occurs on the buffer corresponding to the Alloc_ID, wherein the overflow_ind is set to 1, meanwhile buffer parameter information buf_num and buf_len is reported, wherein buf_num and buf_len are parameters expressed by power of 2 and can cover the ONU models with all buffer sizes.

When the ONU does not support the reporting of buffer parameters, the values of buf_num and buf_len are filled as 0xff.

Step 2: the OLT determines whether to activate an overflow allocation mechanism.

After receiving the Dbru_Report PLOAM message sent by each ONU at uplink, the OLT stores the buffer parameter information and the TCONT buffer overflow indication information reported in real time by each Alloc_ID into a TCONT table. The OLT can conclude through the buffer parameter information a maximum bandwidth theoretically supported by the Alloc_ID in the current configuration, and then determines whether to allow this Alloc_ID to support a traffic exceeding the theoretical maximum bandwidth. The OLT may consider the following three factors according to the following priority order when making a determination.

1. Theoretical maximum bandwidth is less than a guaranteed bandwidth.

2. There exist some available remaining bandwidth at the PON interface.

3. The priority of the Alloc_ID is relatively high.

When the OLT decides to activate an overflow allocation mechanism for the Alloc_ID, the OLT notifies the ONU to enter an overflow report mode through a downlink Dbru_control PLOAM message (as shown in Table 2), wherein the message_id is fixed as 0x15 and overflow_rpt_en is set to 1.

When the OLT considers that the Alloc_ID cannot activate an overflow allocation mechanism, the OLT still needs to transmit a Dbru_control PLOAM message, where overflow_rpt_en is set to 0.

Step 3: the ONU enters an overflow report mode.

After the ONU receives the Dbru_control PLOAM message, if it is judged that the OLT does not allow an overflow mode control, the ONU records the response state of the OLT and does not report the Dbru_control PLOAM message any longer, unless the buffer enters an overflow state again after exiting the overflow state.

If it is judged that the OLT allows an overflow mode control, the ONU changes the DBRu report mode, and calculates the sum of the data amount entering the buffer of the TCONT and the data amount discarded due to full buffer of the TCONT, instead of only calculating the data amount buf_used entering the buffer of the TCONT, wherein the formula is as follows:

$$Dbru(n) = buf\_used(n) + buf\_discard(n)$$

The ONU reports the new DBRu(n) value of the Alloc_ID to the OLT through BufOcc.

While calculating data amount, it is needed to calculate in the unit of an entire packet because the data is discarded in the unit of an entire packet.

Step 4: the OLT enters an overflow based bandwidth allocation mode.

When receiving a DBRu value, the OLT does not care the bandwidth allocation mode; while performing DBA calculation, the OLT determines the calculation method according to the overflow allocation admission state corresponding to the Alloc_ID.

In a normal allocation mode, generally the alpha parameter is 0.25, which enables a smooth traffic and reduces bandwidth fluctuation, but at the same time increases the pressure of the ONU buffer by 4 times; once the DBRu value is overflowed, the calculation algorithm becomes invalid.

In the overflow allocation mode, the alpha value may be adjusted to 1, which not only improves the utilization efficiency of buffer but also enables the DBA to allocate bandwidth to the Alloc_ID as actually needed. Meanwhile, in the case of buffer overflow, since the traffic generally is very large and relatively smooth, the bandwidth fluctuation index will not deteriorate too much.

Figure 5:
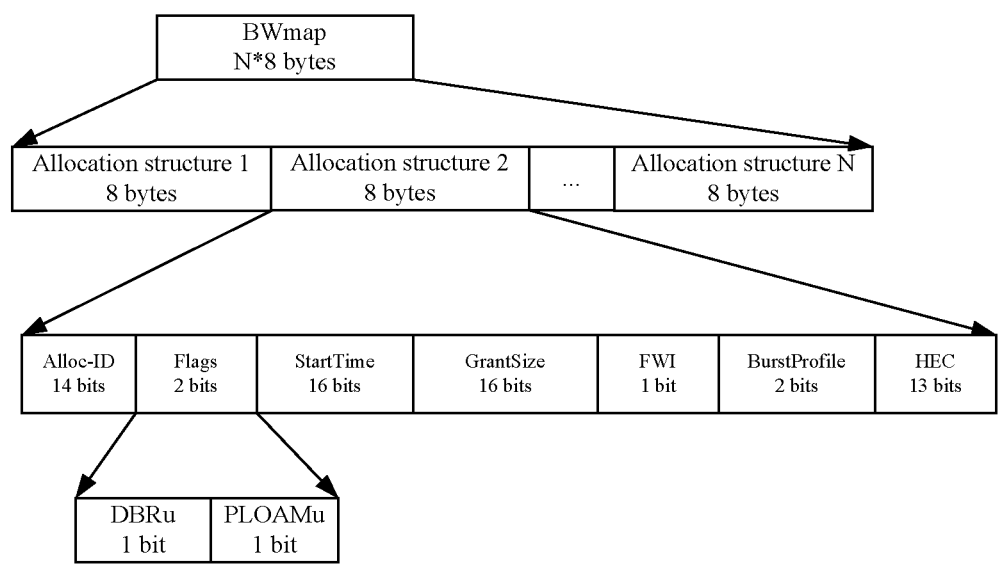
FIG. 5 shows a diagram of a BWMAP item format provided by the related art.

The calculation result of DBA still is transmitted to the Alloc_ID through a BWMAP item (shown in FIG. 5), which is the same as the transmission method under a normal allocation.

In addition, an example embodiment of the present disclosure also considers an exit mechanism during the DBA overflow allocation process.

When the ONU detects that the traffic of the Alloc_ID is reduced and the buffer is not overflowed any more, the ONU can notify the OLT to end the overflow allocation mechanism by transmitting a Dbru_Report PLOAM message (overflow_ind=0); after the OLT transmits a Dbru_Control PLOAM message (overflow_rpt_en=0) to notify the ONU to exit the overflow allocation mechanism, the ONU returns to the normal DBRu report method and meanwhile the OLT returns to the normal allocation mode.

Similarly, when the OLT detects that a remaining bandwidth of a PON interface is reduced or satisfies the requirements of other services, the OLT may forcedly exits the overflow allocation mechanism, and directly transmits a Dbru_Control PLOAM message (overflow_rpt_en=0) to notify the ONU to exit the overflow allocation mechanism.

Although the above content gives a detailed description to the present disclosure, the present disclosure is not limited to the above content; those skilled in the art can make various modifications according to the principle of the present disclosure; therefore, all modifications made according to the principle of the present disclosure shall fall into the scope of protection defined by the claims of the present disclosure.

What is claimed is:

1. A method for improving bandwidth allocation efficiency, comprising:
    in a Passive Optical Network (PON) system, detecting, by an Optical Network Unit (ONU), each Transmission Container (TCONT) of the ONU in real time, and sending, by the ONU, to an Optical Line Terminal (OLT) a private message used for reporting buffer overflow when detecting that buffer overflow occurs on a TCONT;
    sending, by the OLT according to the received private message used for reporting the buffer overflow, to the ONU a private message used for instructing the ONU to activate an overflow allocation mechanism;
    after receiving the private message used for instructing the ONU to activate the overflow allocation mechanism, activating, by the ONU, the overflow allocation mechanism, calculating, by the ONU, an actual traffic of a buffer of the TCONT, and sending, by the ONU, the actual traffic of the buffer of the TCONT to the OLT, wherein the actual traffic of the buffer of the TCONT is a sum of the amount of data entering the buffer of the TCONT and the amount of data discarded due to full buffer of the TCONT; and
    dynamically allocating, by the OLT, a bandwidth to the TCONT according to the actual traffic of the buffer of the TCONT.

2. The method as claimed in claim 1, wherein the private message used for reporting the buffer overflow comprises TCONT buffer overflow indication information, an allocation identifier for identifying the TCONT, and buffer parameter information.

3. The method as claimed in claim 2, wherein after receiving the private message used for reporting the buffer overflow, the OLT calculates a theoretical maximum bandwidth supported by the TCONT corresponding to the allocation identifier according to the buffer parameter information contained in the private message used for reporting the buffer overflow, and generates, according to the theoretical maximum bandwidth, a remaining bandwidth of a PON interface of the OLT and a priority of the TCONT, the private message used for instructing the ONU to activate the overflow allocation mechanism, wherein the generated private message used for instructing the ONU to activate the overflow allocation mechanism comprises an overflow mode admission control identifier and the allocation identifier used for identifying the TCONT.

4. The method as claimed in claim 3, wherein after receiving the private message used for instructing the ONU to activate the overflow allocation mechanism, the ONU activates the overflow allocation mechanism according to the overflow mode admission control identifier contained in the private message used for instructing the ONU to activate the overflow allocation mechanism, and calculates, according to the allocation identifier, a sum of the amount of data entering the buffer of the TCONT and the amount of data not entering the buffer of the TCONT due to buffer overflow to obtain the actual traffic of the buffer of the TCONT, and sends the actual traffic of the buffer of the TCONT to the OLT.

5. The method as claimed in claim 1, further comprising:
    when detecting that the buffer of the TCONT is not overflowed any more, the ONU generates a private message used for reporting no buffer overflow, and sends the generated private message used for reporting no buffer overflow to the OLT, wherein the private message used for reporting no buffer overflow comprises TCONT buffer overflow exit indication information and an allocation identifier used for identifying the TCONT.

6. The method as claimed in claim 5, further comprising:
    receiving, by the OLT, the private message used for reporting no buffer overflow, generating, by the OLT according to the TCONT buffer overflow exit indication information contained in the private message used for reporting no buffer overflow, a private message used for instructing the ONU to stop the overflow allocation mechanism, and sending, by the OLT, the generated private message used for instructing the ONU to stop the overflow allocation mechanism to the ONU, wherein the private message used for instructing the ONU to stop the overflow allocation mechanism comprises an overflow mode stop control identifier and the allocation identifier used for identifying the TCONT.

7. The method as claimed in claim 1, further comprising:
    when the OLT detects that a remaining bandwidth of a PON interface is reduced, sending, by the OLT, a private message used for instructing the ONU to stop the overflow allocation mechanism to the ONU, wherein the private message used for instructing the ONU to stop the overflow allocation mechanism comprises an overflow mode stop control identifier and an allocation identifier used for identifying the TCONT.

8. The method as claimed in claim 6, further comprising:
after the ONU receives the private message used for instructing the ONU to stop the overflow allocation mechanism, stopping, by the ONU, the overflow allocation mechanism of the TCONT corresponding to the allocation identifier according to the overflow mode stop control identifier.

9. The method as claimed in claim 8, wherein
the PON system is a 10-Gigabit Passive Optical Network (XGPON) system;
the private messages used for reporting the buffer overflow or no buffer overflow is a Dynamic Bandwidth Report upstream Physical Layer Operation Administration and Maintenance (Dbru_Report PLOAM) message; and
the private message used for instructing to activate or stop the overflow allocation mechanism is a Dynamic Bandwidth Report upstream Control Physical Layer Operation Administration and Maintenance (Dbru_Control PLOAM) message.

10. The method as claimed in claim 7, further comprising:
after the ONU receives the private message used for instructing the ONU to stop the overflow allocation mechanism, stopping, by the ONU, the overflow allocation mechanism of the TCONT corresponding to the allocation identifier according to the overflow mode stop control identifier.

11. A system for improving bandwidth allocation efficiency, comprising:
an Optical Network Unit (ONU), which is set in a Passive Optical Network (PON) system and is configured to: detect each Transmission Container (TCONT) of the ONU in real time, send a private message used for reporting buffer overflow to an Optical Line Terminal (OLT) when detecting that buffer overflow occurs on a TCONT, activate an overflow allocation mechanism after receiving a private message used for instructing the ONU to activate an overflow allocation mechanism, calculate an actual traffic of a buffer of the TCONT and send the actual traffic of the buffer of the TCONT to the OLT, wherein the actual traffic of the buffer of the TCONT is a sum of the amount of data entering the buffer of the TCONT and the amount of data discarded due to full buffer of the TCONT;
the OLT, which is configured to send, according to the received private message used for reporting the buffer overflow, to the ONU the private message used for instructing the ONU to activate the overflow allocation mechanism, and dynamically allocate a bandwidth to the TCONT according to the actual traffic of the buffer of the TCONT.

12. The method as claimed in claim 10, wherein
the PON system is a 10-Gigabit Passive Optical Network (XGPON) system;
the private messages used for reporting the buffer overflow or no buffer overflow is a Dynamic Bandwidth Report upstream Physical Layer Operation Administration and Maintenance (Dbru_Report PLOAM) message; and
the private message used for instructing to activate or stop the overflow allocation mechanism is a Dynamic Bandwidth Report upstream Control Physical Layer Operation Administration and Maintenance (Dbru_Control PLOAM) message.

\* \* \* \* \*